(12) United States Patent
Gogna et al.

(10) Patent No.: US 6,191,830 B1
(45) Date of Patent: Feb. 20, 2001

(54) ELECTRO-OPTICAL DISPLAY HAVING SPLIT STORAGE CAPACITOR STRUCTURE FOR SERIES CAPACITANCE

(75) Inventors: Pawan Gogna, Yorktown Heights; Peter J. Janssen, Scarborough, both of NY (US)

(73) Assignee: Philips Electronics North America Corporation, New York, NY (US)

( * ) Notice: Under 35 U.S.C. 154(b), the term of this patent shall be extended for 0 days.

(21) Appl. No.: 09/044,546

(22) Filed: Mar. 19, 1998

(51) Int. Cl.[7] ........................................... G02F 1/136
(52) U.S. Cl. .................................................. 349/38
(58) Field of Search .................. 349/43, 41, 39, 349/33

(56) References Cited

U.S. PATENT DOCUMENTS

| | | | |
|---|---|---|---|
| 4,639,087 | * | 1/1987 | Cannella . |
| 5,042,916 | * | 8/1991 | Ukai et al. . |
| 5,126,865 | * | 6/1992 | Sarma . |
| 5,151,806 | * | 9/1992 | Kawamoto . |
| 5,333,004 | * | 7/1994 | Mourey et al. . |
| 5,412,493 | * | 5/1995 | Kunii et al. ............................. 349/43 |
| 5,700,699 | * | 12/1997 | Han et al. ............................. 438/151 |
| 5,886,365 | * | 3/1999 | Kouchi et al. ......................... 257/59 |

FOREIGN PATENT DOCUMENTS

WO9102372   2/1991   (WO) .............................. H01J/5/50

\* cited by examiner

*Primary Examiner*—Kenneth Parker
(74) *Attorney, Agent, or Firm*—John C. Fox

(57) ABSTRACT

An electro-optic display device having a matrix array of picture elements and a thin film structure of storage capacitors associated with each picture element, the device provided with redundancy in the storage capacitor structure by segmenting one of the capacitor plates into two plates to produce two capacitors in series. Because the segmented plates are all on one level of the thin film structure, no additional masking steps are required.

8 Claims, 2 Drawing Sheets

ELECTRO-OPTICAL DISPLAY HAVING SPLIT STORAGE CAPACITOR STRUCTURE FOR SERIES CAPACITANCE

BACKGROUND OF THE INVENTION

This invention relates to electro-optical display devices, such as active matrix liquid crystal display (AMLCD) devices, and more particularly relates to such devices incorporating storage capacitors.

Reflective high density active matrix liquid crystal displays (AMLCDs) on silicon are being considered for high resolution color projection systems, due to the fact that the matrix structure of row and column electrodes, switches and storage capacitors can all be integrated on the silicon substrate below the reflective pixel electrodes, thus enabling the high pixel density required for such high resolution displays.

For example, the 1280 columns and 1024 rows required for HDTV requires that more than 1.3 million pixels must fit onto an area of about 2 square cm. In order to have a sufficient optical aperture for acceptable brightness and contrast ratio, the pixels must be as large as possible. With the reflective AMLCD structure, inter-pixel spacings of around 1 micron are possible, which provides the pixel area necessary to achieve an optical aperture sufficient for acceptable performance.

A typical defect density in the sub-micron CMOS processing techniques used to fabricate such AMLCDs is around one pixel defect per square centimeter. However, in such high resolution displays, one pixel defect in the entire array is sufficient to result in rejection of the display.

The most common defects are cross-over shorts, pixel switch failure and storage capacitor shorts. For example, capacitor shorts reduce the ability of the pixel to hold its display information during the interval between addressing and readdressing, affecting, for example, grey scale rendition.

In order to overcome such defects, and thereby achieve high display quality with high manufacturing yield, redundant structures have been designed into such AMLCDs, including redundant switches and electrodes.

In such displays, a large area (almost 75% of the pixel area) and a thin dielectric layer (400 nm) are needed for the pixel storage capacitor to provide the required capacitance (10 times the capacitance of the liquid crystal material) to hold the pixel voltage over the frame period. Due to this large area and thin dielectric layer, chances of a short are somewhat higher than for the pixel switches and other circuit elements.

A redundant storage capacitor structure is described in published international patent application WO 91/02372. In that case, the pixel capacitor can be a junction or oxide type capacitor or a combination thereof. Since the combination structure is a multilevel multilayer structure, the fabrication thereof requires multiple processing steps, which increases manufacturing cost and decreases yield.

OBJECTS AND SUMMARY OF THE INVENTION

According to the invention, redundant storage capacitors in electro-optic display devices such as AMLCD devices are achieved without the need to redesign the layout of the device, or to resort to multilevel structures, by simply dividing one electrode of each of the capacitors into two electrodes, resulting in two capacitors in series. With such a structure, if a short occurs in one capacitor, the other capacitor will maintain sufficient pixel voltage until readdressing.

A particular advantage of such a structure is that both capacitors are produced in a single level of the device, so that no additional levels, with their associated mask steps and processing steps, are required.

In accordance with a preferred embodiment of the invention, a triple layer of oxide-nitride-oxide is used as the dielectric for the storage capacitors. This composite dielectric has a higher dielectric constant, better breakdown voltage and higher yield than the conventional single layer dielectric.

The reduced level of defects due to capacitor shorts, resulting from the redundant storage capacitor design of the invention, results in improved grey scale rendition and overall improved display quality.

DESCRIPTION OF THE PREFERRED EMBODIMENTS

Figure 1:
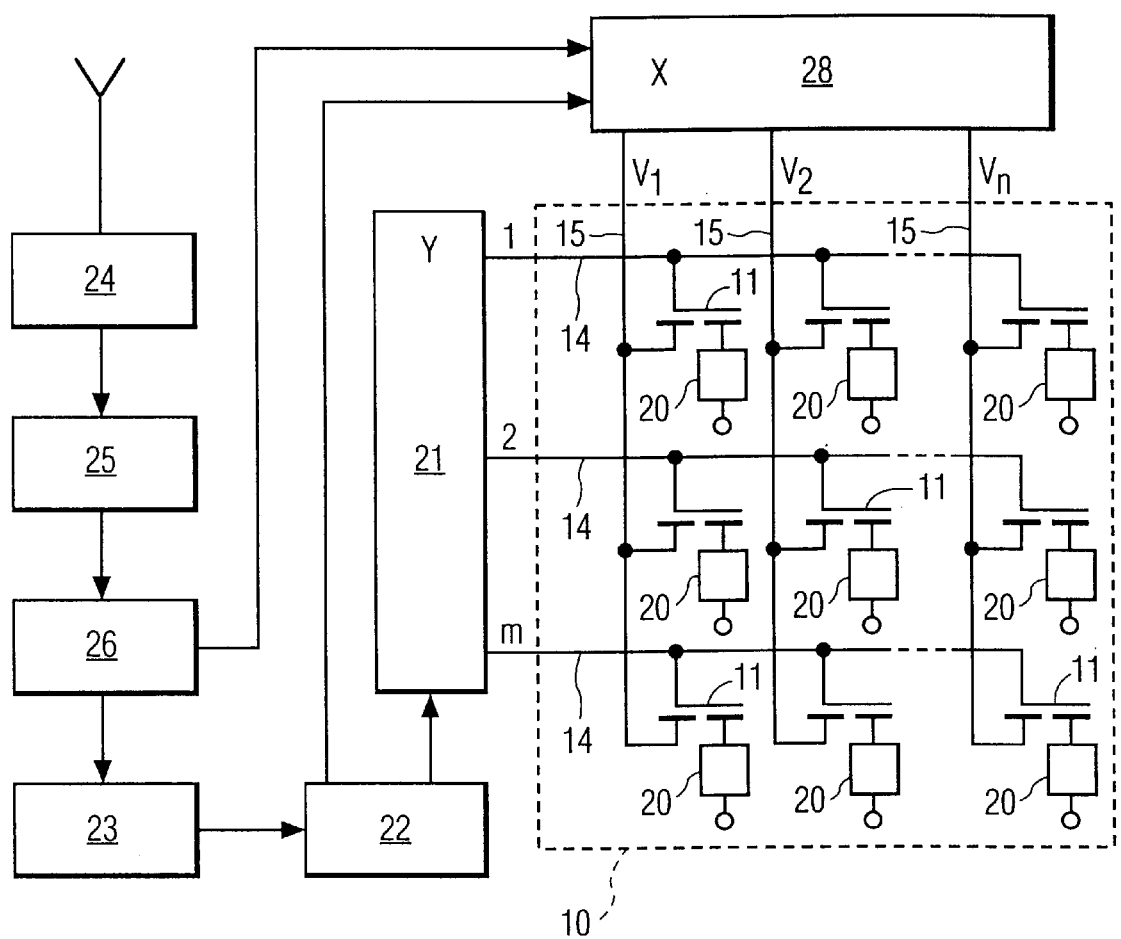
FIG. 1 is a simplified plan view of a typical AMLCD device of the prior art.

Referring to FIG. 1, there is shown schematically a block diagram of a LCD-TV display system of the prior art including a display device which comprises an AMLCD panel 10. The panel 10 consists of m lines (1 to m) with n horizontal display (picture) elements 20 (1 to n) in each line. In practice, the total number of display elements (m×n) in the matrix array may be 100,000 or more (up to 1.3 million for HDTV). Each display element 20 (representing one pixel of the display) has an associated IGFET transistor acting as a switching element. The gates of all the IGFETs in each line are connected to a row (Y) electrode 14 and the source electrodes of each IGFET in a column are connected to a column (X) electrode 15, there being m row electrodes 14 and m column electrodes 15. The drains of the IGFETs 11 are connected to respective electrodes of the display elements in a manner which will be described.

A common counterelectrode for the display elements is carried by a substrate spaced from the substrate carrying the IGFETs and the associated electrodes of the display elements with liquid crystal material disposed therebetween. The liquid crystal material modulates light according to voltage applied there across. Color filters in registration with the picture elements may be employed to produce a color display using known principles.

Addressing of each line of the matrix array of display elements 20 is achieved by applying a gate voltage to the row electrode 14 for that line for an addressing time Ta. This turns on all IGFETs in that row of the matrix, allowing video information to be transferred to the display elements via the column electrodes 15. The row electrodes are sequentially addressed in this manner to provide line-at-a-time scanning of the entire matrix array. One completed scan of the matrix array represents one frame of video information, after which the array is readdressed with the next frame of information.

During the time Ta in which the IGFETs in one line are turned on to allow addressing, all of the other IGFETs in the remaining rows of the array are switched off, thus isolating their associated picture elements from stray voltages which would otherwise introduce display-degrading cross-talk. During this time interval, these isolated picture elements must maintain their picture information by virtue of their natural capacitance and any auxiliary storage capacitance (not shown in this figure).

As can be seen in FIG. 1, the row (Y) electrodes 14 are driven by a digital shift register 21 supplied with regular timing pulses from a clock circuit 22 which is fed with line synchronizing pulses from a synchronization seperator 23 derived from the incoming signals via a tuner 24, IF circuits 25 and video amplifier 26.

Video information signals are supplied to the column (X) electrodes 15 simultaneously from an analog shift register circuit 28, comprising one or more shift registers, supplied with video signals from the video amplifier 26 and timing pulses from the clock circuit 22 in sync with line addressing. The shift register circuit provides serial-to-parallel conversion appropriate to the line-at-a-time addressing of the panel 10, samples the corresponding line in the video signal and places the appropriate voltages on the column (X) electrodes 15, thence to the source side of the IGFETs in the column. When the IGFETs in the line being addressed are turned on, the voltage at each source is transferred to the drain, and thence to the picture element connected to the drain, whereby the liquid crystal associated with the element is charged with the source voltage representing the video information for that element.

Figure 2:
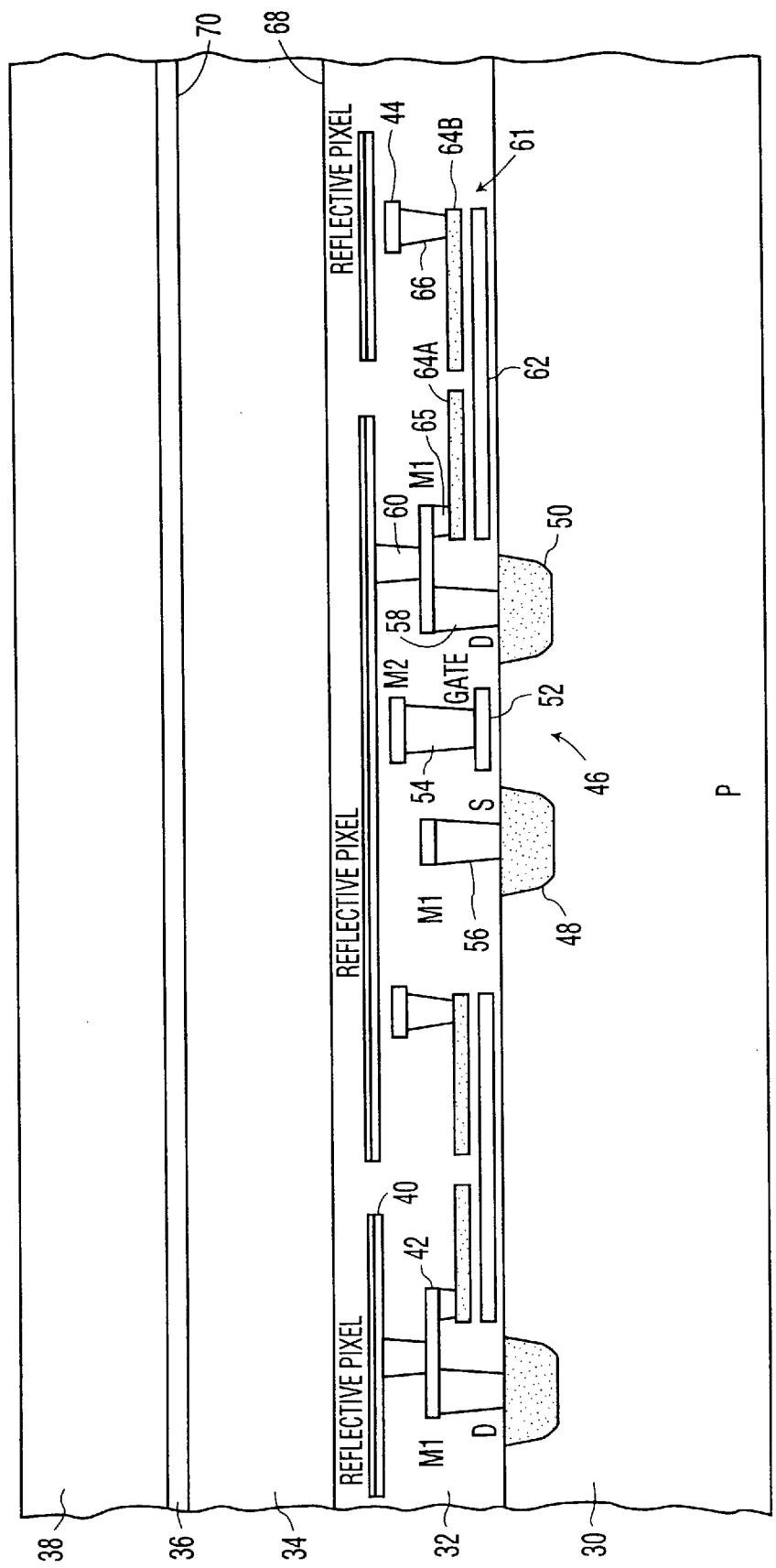
FIG. 2 is a cross section view of a portion of a reflective AMLCD having a redundant storage capacitor structure of the invention.

FIG. 2 is a cross section of a portion of a reflective AMLCD device having a matrix structure the type shown in FIG. 1, illustrating one embodiment of the redundant storage capacitor structure of the invention. The device is composed of a silicon substrate 30, on which are successively provided an oxide layer 32, a liquid crystal layer 34, an ITO electrode 36 and a glass layer 38. An array of pixel electrodes 40 is provided beneath the liquid crystal layer 34 in the oxide layer 32. Also provided in the oxide layer 32 and between the substrate 30 and the pixels 40 are two metal layers 42 and 44. These metal layers form mutually orthogonal row and column lines. An array of CMOS insulated gate field effect transistors (IGFETs) 46 are formed in the silicon substrate 30. The source and gate electrodes 48 and 52 of these transistors are connected to the metal layers 42 and 44 via vertical plugs 56 and 54, respectively. The drains 50 are connected to the pixel electrodes 40 via metal layer 42 and vertical plugs 58 and 60.

As known, orientation layers (not shown) may be provided on the surfaces 68 and 70 of oxide layer 32 and ITO layer 36, respectively, to provide a preferred orientation or alignment to the liquid crystal molecules of layer 34 in contact with these orientation layers. For twisted nematic liquid crystals (TN LC), the alignment directions of the orientation layers are generally orthogonal with respect to one another, in order to impart a 90 degree twist to the liquid crystal molecules across the thickness of the liquid crystal layer.

Capacitors 61 are composed of plates 62 and 64, typically of polysilicon or the like, and the intervening portion of oxide layer 32. In accordance with the invention, capacitors 61 have a redundant structure produced by dividing plate 64 into two segments 64A and 64B, thereby creating two capacitors in series. Since all plates 64 of the matrix array lie in the same plane, the series structure is accomplished by the simple expedient of altering the patterning mask used in the production of the plates 64, so that two plate segments are produced at each storage capacitor site.

The capacitors 61 are connected between the row and column electrodes via plugs 65 and 66, and to the pixel electrodes 40 via plugs 60.

Creating two capacitors in series as described above may result in a reduction of the total storage capacitance per pixel. However, sufficient capacitance will remain to maintain the information state of the pixel at a level to prevent a pixel defect. That is, for example, while grey scale level drift lower than that instructed during addressing, the error is hardly noticeable in a large display, whereas a complete failure of the storage capacitor would result in a complete pixel failure, and rejection of the entire display device.

Additional capacitance may be achieved by providing a triple layer dielectric between the plates, such as oxide-nitride-oxide, eg., silicon dioxide-silicon nitride-silicon oxide.

The invention has been described in terms of a limited number of preferred embodiments. However, other embodiments and variations will become apparent to the skilled artisan from the above description and the appended claims, and these embodiments and variations are intended to be encompassed within the scope of the claims as if fully described herein. For example, while the description has been made in terms of liquid crystal displays, and more particularly active matrix reflective LCDs, the invention is equally applicable to other types of LCDs, such as passive matrix LCDs and transmissive LCDs, as well as other types of electro-optic displays, in which there is a need for auxiliary capacitance for the picture elements.

What we claim as our invention is:

1. An electro-optic display device comprising one or more picture elements, each picture element comprised of a first pixel electrode 40 and a second facing electrode 36 and an electro-optic medium therebetween, and each picture element having associated row and column electrodes 42, 44 and associated storage capacitor 61, the storage capacitor comprised of parallel plates 62, 64 of conductive material and a dielectric medium 32 therebetween, characterized in that one plate 64 of the storage capacitor is divided into first and second separated segments 64A, 65B, resulting in first and second capacitors in series with each picture element, and one of the first and second segments 64A, 64B is connected to the pixel electrode 40, and the other of the first and second segments 64A, 64B is directly connected to any one of the column or row electrodes 14, 15.

2. The electro-optic display device of claim 1 in which a plurality of picture elements are arranged in a matrix array, and the second facing electrode is a common electrode for the array.

3. The electro-optic display device of claim 2 in which switches are associated with each pixel electrode.

4. The electro-optic display device of claim 3 in which the pixel electrodes are light-reflective.

5. The electro-optic display device of claim 4 in which the reflective electrodes, row and column electrodes, switches and capacitors are formed in a multilayer thin film structure on a substrate, and the reflective electrodes are located above the row and column electrodes, switches and capacitors.

6. The electro-optic display device of claim 5 in which the substrate is silicon, and the switches are CMOS IGFETs formed on the substrate.

7. The electro-optic display device of claim 1 in which the electro-optic medium is twisted nematic liquid crystal material.

8. The electro-optic display device of claim 1 in which the dielectric medium consists of a composite oxide-nitride-oxide layer.

* * * * *